(12) United States Patent
Gerdes et al.

(10) Patent No.: US 8,121,780 B2
(45) Date of Patent: Feb. 21, 2012

(54) METHOD FOR OFFERING A USER REWARD BASED ON A CHOSEN NAVIGATION ROUTE

(75) Inventors: Arati Gerdes, Palo Alto, CA (US); Daniel Rosario, Santa Cruz, CA (US); Jonathan Lee, Puyallup, WA (US)

(73) Assignee: Volkswagen of America, Inc., Auburn Hills, MI (US)

( * ) Notice: Subject to any disclaimer, the term of this patent is extended or adjusted under 35 U.S.C. 154(b) by 947 days.

(21) Appl. No.: 12/122,706

(22) Filed: May 18, 2008

(65) Prior Publication Data

US 2009/0287408 A1    Nov. 19, 2009

(51) Int. Cl.
*G01C 21/00* (2006.01)

(52) U.S. Cl. ........ 701/202; 701/201; 701/209; 701/210; 340/439; 340/994; 340/988; 340/990; 340/989

(58) Field of Classification Search ............... 701/201, 701/202, 209, 210; 340/439, 994, 988, 990, 340/989

See application file for complete search history.

(56) References Cited

U.S. PATENT DOCUMENTS

| | | | | |
|---|---|---|---|---|
| 4,370,718 A * | 1/1983 | Chasek | ........................ | 701/117 |
| 5,327,123 A * | 7/1994 | Heimann et al. | ............. | 340/916 |
| 5,913,917 A * | 6/1999 | Murphy | ........................ | 701/123 |
| 5,931,888 A * | 8/1999 | Hiyokawa | ..................... | 701/208 |
| 6,038,505 A | 3/2000 | Probst et al. | | |
| 6,163,748 A | 12/2000 | Guenther | | |
| 6,415,226 B1 * | 7/2002 | Kozak | .......................... | 701/210 |
| 6,421,606 B1 * | 7/2002 | Asai et al. | ...................... | 701/209 |
| 7,031,832 B2 * | 4/2006 | Kawasaki et al. | ............. | 701/210 |
| 7,324,893 B2 * | 1/2008 | Yamashita et al. | ............ | 701/117 |
| 2003/0078707 A1 | 4/2003 | Shioda et al. | | |
| 2004/0220768 A1 | 11/2004 | Klein | | |
| 2005/0192720 A1 * | 9/2005 | Christie et al. | ................... | 701/19 |
| 2006/0129313 A1 * | 6/2006 | Becker et al. | ................. | 701/202 |
| 2007/0282638 A1 * | 12/2007 | Surovy | .............................. | 705/4 |
| 2009/0119006 A1 * | 5/2009 | Silver et al. | .................... | 701/204 |
| 2010/0076878 A1 * | 3/2010 | Burr et al. | ........................ | 705/34 |

FOREIGN PATENT DOCUMENTS

| | | |
|---|---|---|
| DE | 19835558 A1 | 2/2000 |
| DE | 10059746 A1 | 10/2001 |
| DE | 10034465 C1 | 2/2002 |

(Continued)

OTHER PUBLICATIONS

Anna Lagerkvist, Study: Sat-nay to display greenest route, available at http://www.tech.co.uk/gadgets/satellite-navigation/standalone-gps-devices/satellite-navigation/news/study-sat-nav-to-display-greenest-ro..., (last visited Nov. 1, 2007).

Greenest Route with SatNav, available at http://www.treehuggercom/files/2007/01/greenest_route.php (last visited Nov. 1, 2007).

(Continued)

*Primary Examiner* — Hussein Elchanti
*Assistant Examiner* — Redhwan K Mawari
(74) *Attorney, Agent, or Firm* — Manfred Beck, P.A.

(57) ABSTRACT

A method for offering a user reward based on a chosen navigation route includes calculating alternative routes from a starting location to a destination location by taking into consideration route segments including public transportation route segments and road network route segments. The alternative routes are presented to a user. A reward is offered for choosing a respective one of the routes. A navigation system that performs the route calculation preferably queries a network database for public transportation information.

15 Claims, 2 Drawing Sheets

FOREIGN PATENT DOCUMENTS

| | | | |
|---|---|---|---|
| DE | 10044259 A1 | | 4/2002 |
| DE | 10053874 B4 | | 5/2002 |
| EP | 1172633 A2 | | 1/2002 |
| EP | 1 515 122 A1 | * | 3/2005 |
| JP | 2005030823 A | * | 2/2005 |
| WO | 2006117116 A1 | | 11/2006 |
| WO | WO 2008/032075 | * | 3/2008 |

OTHER PUBLICATIONS

Eva Ericsson et al., Abstract of the article "Optimizing Route Choice for Lowest Fuel Consumption—Potential Effects of a New Driver Support Tool," available at http://ntlsearch.bts.gov/tris/record/tris/01042318.html (last visited Nov. 1, 2007).

* cited by examiner

METHOD FOR OFFERING A USER REWARD BASED ON A CHOSEN NAVIGATION ROUTE

BACKGROUND OF THE INVENTION

Field of the Invention

The invention relates in general to a method for calculating navigation routes from a starting location to a destination location by taking into consideration route segments including public transportation route segments and road network route segments.

Conventional in-vehicle navigation systems generally only plot the shortest or fastest route for a driver to drive from a starting location to a destination location. These in-vehicle navigation systems do not take into account the public transportation network when plotting such routes. More advanced navigation systems, such as the navigation system of U.S. Pat. No. 6,421,606 B1, provide information for a route using public transportation as an alternative to a road network route. In addition to searching for a road network route from a current location to a destination location, it is determined whether the current location and the destination location are within a zone in which public transportation can be used. When the current location and the destination location are determined to be within a public transportation zone, a route using public transportation is searched for. The cost of the route using public transportation and the cost of the road network route are compared. When the cost of the public transportation route falls within a predetermined limit, the navigation system indicates the public transportation route. The route costs are calculated considering factors such as required travel time and ticket fees. The navigation system may also recommend public transportation when no parking is available near the destination, or based on traffic information concerning the road network route.

Some navigation systems even calculate so-called hybrid routes which allow a driver to use a car for a first portion of a route and allow the driver to use public transportation for a second portion of the route. Such navigation systems are for example described in European Patent Application Publication No. EP 1 172 633 A2 and German Patent No. DE 100 53 874 B4.

SUMMARY OF THE INVENTION

It is a general object of the invention to provide a method for calculating navigation routes which reduces problems resulting from road traffic and congestion. In view of environmental problems caused by road traffic, it is in particular an object of the invention to increase the likelihood that drivers will choose public transportation options over using personal motor vehicles. Another object of the invention is to provide a method for calculating navigation routes that offer drivers route options involving the use of the public transportation network which may be cheaper, faster, more environmentally friendly and/or more convenient than a route that relies solely on the road network. Another object of the invention is to provide a method for offering a user reward based on a navigation route that the user chooses.

With the foregoing and other objects in view there is provided, in accordance with the invention, a method for offering a user reward based on a chosen navigation route, wherein the method includes the following steps:

inputting a destination location by using an interface for a navigation system;

calculating routes from a starting location to the destination location by taking into consideration route segments including public transportation route segments and road network route segments;

presenting the routes as alternative routes to a user; and offering a reward for choosing a respective one of the routes.

An advantage of taking into account public transportation route segments and offering a reward for taking a given one or given ones of the calculated routes is that the behavior of individual users can be influenced in a manner that benefits not only the individual by offering a possibly cheaper, faster, and/or more convenient route, but also benefits the community by reducing road traffic and consequently reducing emissions. Taking into account public transportation route segments means that that public transportation is considered as an option, but need not be part of the calculated route.

According to another mode of the method of the invention, the step of calculating routes from the starting location to the destination location includes querying, with the navigation system, a network database for public transportation information. This allows using information that is updated on a regular basis and therefore the calculation of the alternative routes is made more reliable.

According to another mode of the method of the invention, the step of querying the network database includes using a wireless Internet access to retrieve information about public transportation schedules. An advantage of using a wireless Internet access is that in areas where wireless vehicle-to-infrastructure networks exist, the method according to the invention can use targeted public transportation information from this network. Alternatively, if no Internet access is available, information that is stored in the navigation system can be used to calculate the alternative routes and offer applicable rewards.

According to another mode of the method of the invention, the step of calculating the routes includes calculating at least one hybrid route including a public transportation route segment and a road network route segment.

According to another mode of the method of the invention, the step of calculating the routes includes searching for routes offering a park-and-ride opportunity. An advantage of routes that offer a park-and-ride opportunity is that it makes the trip more convenient for the user and thus a user has an incentive to use public transportation for a portion of the route.

According to another mode of the method of the invention, the step of calculating the routes includes using up-to-date information including real-time road traffic information and public transportation route schedule information. An advantage of using up-to-date information is that traffic jams, accidents, lane closures, weather conditions, current delays in public transportation and any other real-time information can be taken into account which increases the accuracy of the route calculation.

According to another mode of the method of the invention, the step of calculating the routes includes taking into account at least one item of information such as an average speed on a road network route segment, a schedule for a public transportation route segment, a fare price for a public transportation route segment, parking costs, an applicable discount for a route and a real-time location of a public transportation vehicle.

Another mode of the method according to the invention includes the step of displaying, with the navigation system, a location of a public transportation vehicle in a real-time manner as a dynamic point of interest. An advantage of displaying the public transportation vehicle in real-time is that the user can coordinate the drive or walk to the bus stop or train station with the arrival time of the bus or train. Also, if for example several buses drive on the same route, a user can estimate a waiting time for a second bus if the user misses the first bus.

Another mode of the method according to the invention includes the step of displaying, with the navigation system, respective estimated travel costs and estimated travel times for the alternative routes in order to allow a user to compare the alternative routes. The estimated travel costs and estimated travel times for the alternative routes can for example be added as additional information to the map information shown on the screen for the navigation system.

Another mode of the method according to the invention includes the step of displaying respective estimates for emissions generated for the alternative routes. Displaying estimates of emissions such as emissions of carbon dioxide, carbon monoxide, smoke, soot particles, unburned hydrocarbons, nitrogen oxides, or sulfur dioxide allows a user to select a route based on the environmental impact of a route rather than selecting a route based on how fast or expensive a route is.

Another mode of the method according to the invention includes the step of measuring an impact of route calculations on user behavior by using a wireless broadcasting technology. Wireless broadcasting may be achieved by using a terrestrial radio transmission, a satellite transmission, a two-way communication such as a cellular network communication, or wireless technologies known as WIFI and WIMAX. An advantage of measuring user behavior is for example that user rewards can be adjusted and fine-tuned in order to achieve a desired user behavior.

Another mode of the method according to the invention includes the step of offering a reward for using public transportation for at least one route segment wherein the reward is a user reward such as a free travel ticket, a discounted travel ticket, free parking, discounted parking, a free pass to a car pool lane, and a monetary reward.

Another mode of the method according to the invention includes the step of performing an authentication with a wireless transmitter to be carried by a user for identifying a user entitled to a reward. The wireless transmitter may for example be an RFID (radio-frequency identification) device that is embedded in the user's car key or is carried on a key chain so that the RFID device can easily be used to redeem a reward.

Another mode of the method according to the invention includes the step of performing an authentication by requiring a user to enter an authorization code in order to identify a user entitled to a reward. In this case the user could redeem a reward, for example a free parking ticket or travel ticket, by entering the authorization code into a ticket machine.

Another mode of the method according to the invention includes the step of calculating an accumulated environmental impact of a user's travel activities in terms of an amount of carbon dioxide generated. An advantage of calculating an accumulated environmental impact is that it is possible to reward users for reducing their overall environmental impact by taking into account a number of trips over a period of time.

Another mode of the method according to the invention includes the step of tracking an arrival time of a public transportation vehicle and providing information on how to adjust a travel time and/or a vehicle speed of a personal vehicle in order to allow coordinating the travel time of the personal vehicle and the arrival time of the public transportation vehicle.

Another mode of the method according to the invention includes the step of presenting, with the navigation system, return trip options for routes involving public transportation. This allows a user to plan ahead and the user may reject some of the alternative routes involving public transportation if these routes do not provide adequate return trip options.

According to another mode of the method of the invention, the step of calculating routes includes taking into account current traffic information together with historical models of traffic congestion on a road network in order to calculate travel times, fuel consumption and emissions generated on the road network. Combining current traffic information, such as real-time traffic speeds on a road network and historical models of traffic congestion allows a more precise and reliable calculation of routes.

According to another mode of the method of the invention, the step of calculating routes includes weighting route segments according to criteria including a length of a route segment, a speed limit for a route segment, emissions generated on a route segment, fuel consumed on a route segment, and traffic congestion on a route segment.

Other features which are considered as characteristic for the invention are set forth in the appended claims.

Although the invention is illustrated and described herein as embodied in a method for calculating navigation routes from a starting location to a destination location and offering a user reward based on a chosen navigation route, it is nevertheless not intended to be limited to the details shown, since various modifications and structural changes may be made therein without departing from the spirit of the invention and within the scope and range of equivalents of the claims. In the claims and in the description of the preferred embodiments, an introduction of elements by the articles "a", "an", or "the" is intended to mean that there can be one or more of these elements.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
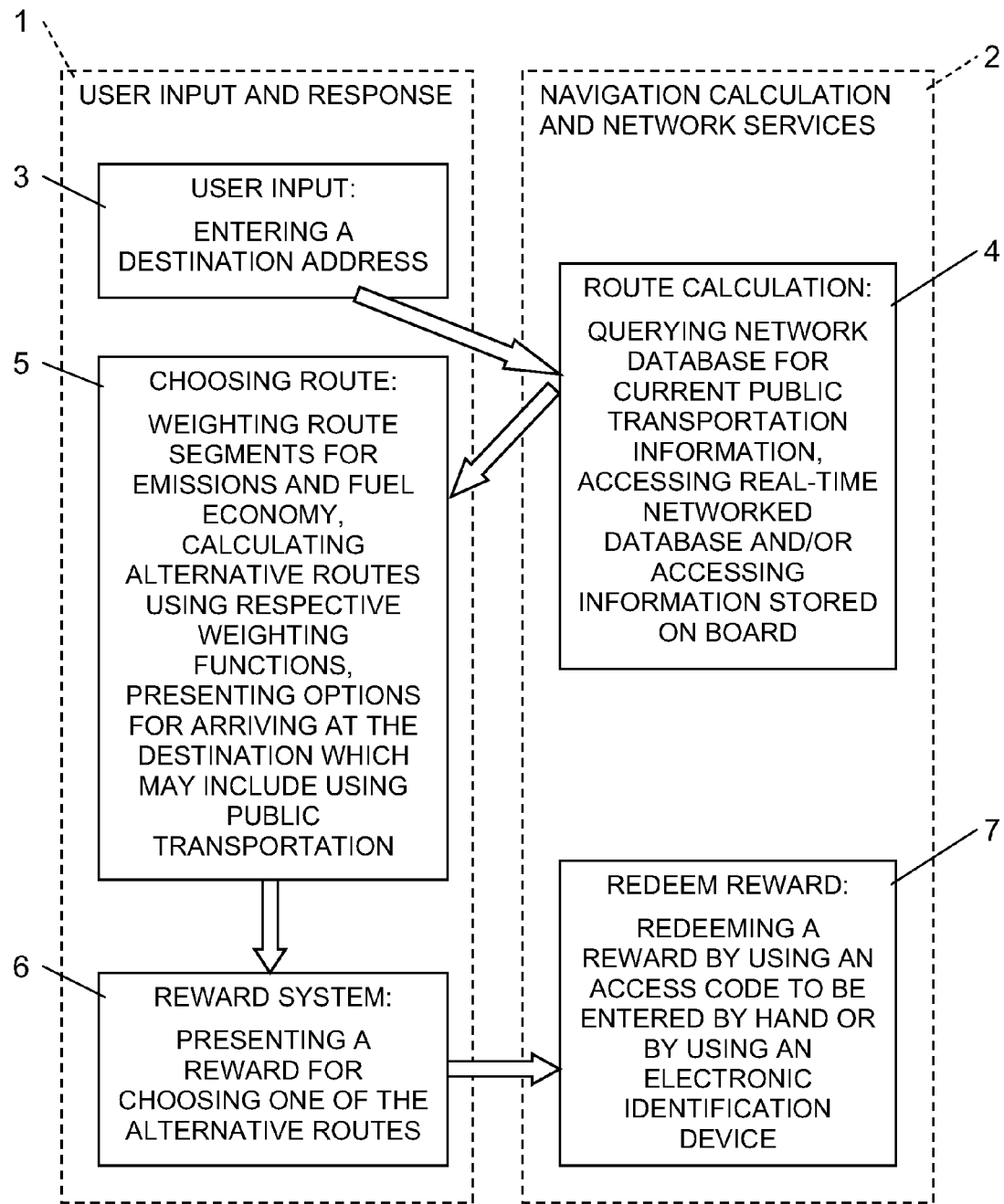
FIG. 1 is a flow chart illustrating the user behavior and the navigation system behavior for an exemplary method according to the invention.

Referring now to the figures of the drawings in detail and first, particularly, to FIG. 1 thereof, there is shown a flow chart illustrating the user behavior and the navigation system behavior for an exemplary method according to the invention. The left portion of FIG. 1 illustrates the inputs or responses of a user. The user inputs and user responses are grouped within a rectangle 1. The right portion of FIG. 1 illustrates the tasks performed by the navigation system and the network services. The tasks of the navigation system and the network services are grouped together in a rectangle 2.

The user input block 3 indicates that a user, which in most cases will be the driver of a motor vehicle, enters a desired destination location into the navigation system. The step of entering the destination location is for example performed by entering a destination address with a touch screen or by speaking into a microphone that is connected to a speech recognition system. In a subsequent route calculation block 4, alternative routes, which may include road network route segments and public transportation route segments, are calculated. In order to perform a route calculation, the navigation system queries a network database for current public transportation information, such as public transportation schedules. The calculation of routes includes accessing a real-time networked database and/or accessing information that is stored on-board in the navigation system of the vehicle. The information that is retrieved for the calculation may include public transportation route schedules, information to be used for calculating costs involved, information on fare prices for public transportation, route information for public transportation, information on park-and-ride opportunities and parking costs, real-time road traffic information such as an average speed on a road network route segment, an applicable discount for a route, and a real-time location of a public transportation vehicle.

The routes from the starting location to the destination location include route segments that are weighted for emissions and fuel economy. The alternative routes are calculated by using respective new weighting functions. The user is presented with options for arriving at the destination location. Depending on the availability of public transportation options, a route may include public transportation route segments. The alternative routes are presented to the user and the user can choose one of the routes as is illustrated by block 5 in FIG. 1.

In accordance with the invention, a reward is offered for choosing one or given ones of the alternative route options as is indicated in block 6 of FIG. 1. The reward or incentive for choosing a given route may be a free or discounted travel ticket, free or discounted parking, a free pass to a car pool lane or some other reward that the user can redeem.

The step of redeeming the reward is illustrated by block 7 in FIG. 1. One method for redeeming a reward includes entering an authorization code before the reward can be redeemed. The step of redeeming the reward can be simplified if the authorization for redeeming the reward is performed wirelessly, for example with an RFID that is embedded in the vehicle key. In this case, the user simply waves the vehicle key at a special RFID reader in order to redeem the reward. As mentioned above, the reward may be a free or discounted fare ticket or free or discounted parking. Of course, the reward may also be a certain number of reward points. The user could accumulate the reward points and redeem them at a later time.

Figure 2:
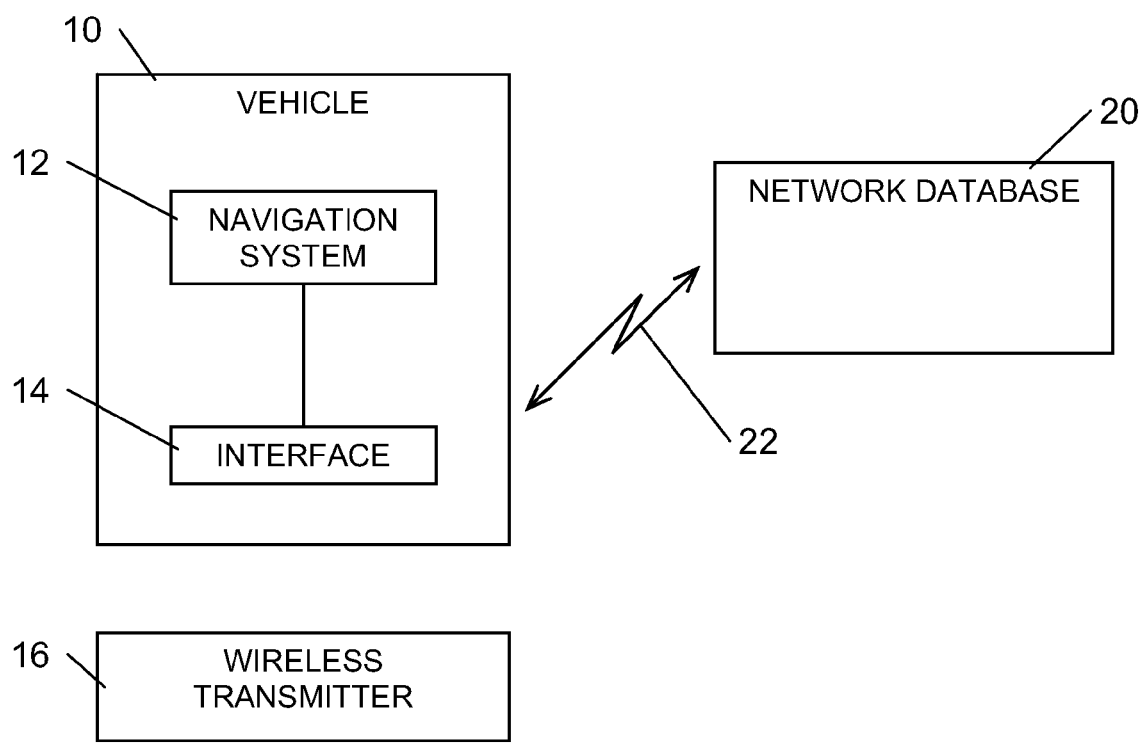
FIG. 2 is a schematic diagram for illustrating main components used for performing the method according to the invention.

FIG. 2 is a schematic diagram for illustrating main components used for performing the method according to the invention. A vehicle 10 has a navigation system 12 that is operatively connected to an interface 14, which is used to input a destination location and a starting location. The interface 14 may for example be a touchscreen that is used to input information and to display information to the user. The navigation system 12 is operatively connected to a network database 20 via a wireless connection 22. A wireless transmitter 16, which may be embodied as an RFID component, is provided to perform an authentication function when the user redeems a reward.

In accordance with the invention, traffic and public transportation information is accessed by using wireless connectivity between a vehicle and a networked database. Park-and-ride opportunities, public transportation scheduling and fare information are taken into account when calculating alternative routes for the user. Public transportation routes are included as possible route segments. Route segments are weighted according to criteria such as emissions generated, fuel spent and traffic congestion, and routes are calculated using these criteria as cost functions. If a viable public transportation alternative is found, the information is supplied to the user, so that the user may choose between driving the entire route and using public transportation for at least a portion of the route.

In order to increase the quality and accuracy of the suggested alternative routes, the positions of relevant buses, trains or other public transportation options are preferably tracked in real-time and displayed to the user as dynamic points of interest in the navigation map. The user is offered a choice of transportation options which take advantage of a real-time tracking of the public transportation network. The alternative routes that include the use of public transportation could be cheaper, faster, more convenient or more environmentally friendly than a route that requires using a motor vehicle for the entire trip.

As mentioned above, so-called hybrid routes are calculated. These hybrid routes involve a combination of driving in a personal motor vehicle and using the public transportation networks. The route calculation uses up-to-date information on traffic and public transportation schedules. The locations of public transport vehicles are displayed to the user in real-time as dynamic points of interest on a screen of the navigation system. Travel times and prices or costs involved are displayed to the user so that the prices and travel times of the alternative route options can be compared. The up-to-date information that is provided for the routing calculation can be transmitted by broadcasting technologies such as radio transmission, satellite transmission or two-way communication technologies such as cellular networks, WIFI or WIMAX.

When a two-way communication is used, it is possible to measure the impact of the hybrid routing system according to the invention on user behavior and to reward the user for using routes that include the use of public transportation, e.g. by offering free or discounted travel tickets or free parking or a free pass to carpool lanes. As already indicated above, upon arriving at a public transportation facility, parking facility or public transportation vehicle, the user could redeem the reward with an access code or by showing his or her vehicle key. In this case, the vehicle key has an embedded wireless transmitter, such as an RFID, as a device for authentication to redeem the ticket. Alternatively, the wireless transmitter could be embodied as a separate component that can be worn on a key chain together with the vehicle key. In addition or as an alternative to incentives, such as free or discounted travel and parking tickets, further incentives are possible wherein the navigation system takes into account the accumulated carbon footprint of the user and wherein prizes or rewards are offered to the users with the smallest carbon footprint. In order to determine the carbon footprint, the navigation system may for example take into account the amount of use of public transportation and how efficient a user drives a vehicle in terms of fuel consumption.

In addition to performing the routing calculation, the navigation system may also track the arrival time of a public transportation vehicle and display an estimated arrival time for the user. Tracking the arrival time of a public transportation vehicle is for example useful when picking someone up from a train station. In this case, a user can adjust his or her own travel time in order to arrive in time at the train station or arrange for parking if the train is delayed and a long wait is expected.

A typical mode of the method according to the invention is described in terms of three main aspects, namely by plotting a route, by presenting routes to the user and by offering a reward for choosing a route. First, when a user plots a route from a starting location to a destination location, alternative route options are calculated such that the route options may include the use of public transportation. The calculation of routes including the public transportation networks will take public transportation schedules into account in order to get an accurate estimate of the total travel time. Next, the alternative route options are presented to the user. The user will be informed about travel times, fare prices, fuel costs and emissions for the alternative routes and the user will be able to compare these values for the different options. When routes involving public transportation are presented, return trip options at the destination will be presented as well as any applicable rewards for choosing a given route. In order to facilitate an accurate comparison of travel times, displayed travel times on the road network will reflect current traffic conditions.

In the following, the general operation and applications of the method according to the invention will be described. A main interface screen for displaying imagery is provided in the dashboard of the vehicle. An input device is also provided on the dashboard of the vehicle. As already described above, a destination entry is performed by a user who inputs the desired destination location.

After entering the destination location, a route calculation is performed. In order to calculate a route from the current location or starting location to the desired destination location, the system performs a search for public transportation routes and schedules for the applicable region, focusing on public transportation routes that offer park-and-ride opportunities. The information that is used for a route calculation includes, for example, public transportation routes, average speeds on these routes, schedules, fares, parking costs, any applicable discounts, codes (authentication codes) for such discounts, and the real-time locations of the public transportation vehicles.

Current traffic information together with historical models of traffic congestion on the road networks are used to more accurately calculate travel times, fuel used and emissions generated on the road networks, so that a better comparison can be made between the use of the road network and the use of the public transportation network. For the calculation of route alternatives, route segments (road network segments, public transportation route segments and, if applicable, segments covered by foot) are weighted according to their length and speed limit, and are further weighted according to emissions generated, fuel spent and traffic congestion on the route segments. Public transportation route segments typically have low weights for emissions generated, fuel spent and traffic congestion. In addition to "road-only" routes, routes which combine the use of a personal vehicle with the use of the public transportation network are calculated, based on heuristics that take into account the above-mentioned criteria.

A route comparison is done after the route calculation. Route alternatives are presented on the screen along with the corresponding estimated travel times, emissions generated and the cost involved (e.g. gas price and/or fare price). Travel times are calculated using current traffic conditions to enable the user to accurately compare trip options. If a calculated route involves public transportation, return trip possibilities and schedules are displayed along with the route. In accordance with an embodiment of the invention, the route information for a given route can be superimposed on a map view that shows at least a portion of the route. In this case, route information, such as a fare price, applicable parking fees for parking at a train station and a departure time would be placed next to the train station shown on the map. By placing route information next to the corresponding location on a map, it is easier for a user to understand the information provided on the screen.

In order to encourage the use of public transportation, a reward or incentive can be offered. The reward may for example be a discounted fare price or discounted parking at a train station. The rewards for the respective routes may be taken into account by the navigation system when performing route comparisons. The navigation system uses wireless access to the Internet in order to get information about public transportation schedules. In areas where wireless vehicle-to-infrastructure networks exist, the system will use targeted public transportation information from this network.

What is claimed is:

1. A method for offering a user reward based on a chosen navigation route, the method which comprises:
    inputting a destination location by using an interface for a navigation system;
    calculating routes from a starting location to the destination location by taking into consideration route segments including public transportation route segments and road network route segments, wherein the step of calculating routes from the starting location to the destination location includes querying, with the navigation system, a network database for public transportation information and wherein the step of calculating the routes includes calculating at least one hybrid route including a public transportation route segment and a road network route segment;
    presenting the routes including the at least one hybrid route as alternative routes to a user;
    offering a reward for choosing a respective one of the routes; and
    redeeming a reward by performing an authentication operation selected from the group consisting of performing an authentication with a wireless transmitter to be carried by a user for identifying a user entitled to a reward and performing an authentication by requiring a user to enter an authorization code in order to identify a user entitled to a reward.

2. The method according to claim 1, wherein the step of querying the network database includes using a wireless Internet access to retrieve information about public transportation schedules.

3. The method according to claim 1, wherein the step of calculating the routes includes searching for routes offering a park-and-ride opportunity.

4. The method according to claim 1, wherein the step of calculating the routes includes using up-to-date information including real-time road traffic information and public transportation route schedule information.

5. The method according to claim 1, wherein the step of calculating the routes includes taking into account at least one item of information selected from the group consisting of an average speed on a road network route segment, a schedule for a public transportation route segment, a fare price for a public transportation route segment, parking costs, an applicable discount for a route and a real-time location of a public transportation vehicle.

6. The method according to claim 1, which comprises displaying, with the navigation system, a location of a public transportation vehicle in a real-time manner as a dynamic point of interest.

7. The method according to claim 1, which comprises displaying, with the navigation system, respective estimated travel costs and estimated travel times for the alternative routes in order to allow a user to compare the alternative routes.

8. The method according to claim 7, which comprises displaying respective estimates for emissions generated for the alternative routes.

9. The method according to claim 1, which comprises measuring an impact of route calculations on user behavior by using a wireless broadcasting technology.

10. The method according to claim 1, which comprises offering a reward for using public transportation for at least one route segment wherein the reward is a user reward selected from the group consisting of a free travel ticket, a discounted travel ticket, free parking, discounted parking, a free pass to a car pool lane, and a monetary reward.

11. The method according to claim 1, which comprises calculating an accumulated environmental impact of a user's travel activities in terms of an amount of carbon dioxide generated.

12. The method according to claim 1, which comprises tracking an arrival time of a public transportation vehicle and providing information on how to adjust one of a travel time and a vehicle speed of a personal vehicle in order to allow coordinating the travel time of the personal vehicle and the arrival time of the public transportation vehicle.

13. The method according to claim 1, which comprises presenting, with the navigation system, return trip options for routes involving public transportation.

14. The method according to claim 1, wherein the step of calculating routes includes taking into account current traffic information together with historical models of traffic congestion on a road network in order to calculate travel times, fuel consumption and emissions generated on the road network.

15. The method according to claim 1, wherein the step of calculating routes includes weighting route segments according to criteria including a length of a route segment, a speed limit for a route segment, emissions generated on a route segment, fuel consumed on a route segment, and traffic congestion on a route segment.

* * * * *